Figure 1:
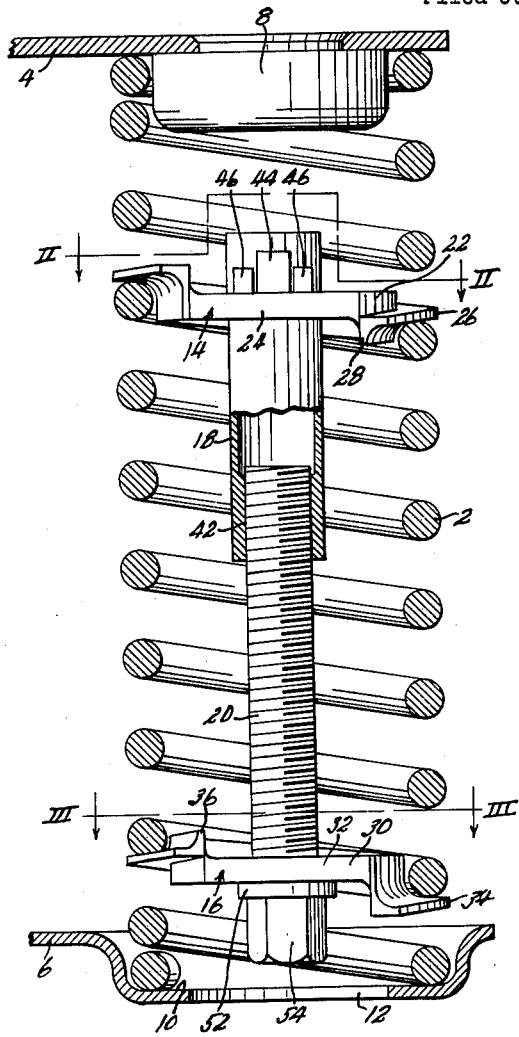

June 21, 1966  E. C. HOWARD ETAL  3,256,594
SPRING COMPRESSING TOOL
Filed July 10, 1964

INVENTORS.
Eugene C. Howard
Dennis N. Holbrook
BY John A. Hamilton
Attorney.

United States Patent Office 3,256,594
Patented June 21, 1966

3,256,594
SPRING COMPRESSING TOOL
Eugene C. Howard, 8325 Park St., and Dennis H. Holbrook, 710 W. 13th St., both of Kansas City, Mo.
Filed July 10, 1964, Ser. No. 381,788
3 Claims. (Cl. 29—227)

This invention relates to new and useful improvements in tools for handling heavy coil springs, and has particular reference to a tool for compressing such springs.

In many applications heavy coil springs are compressed between relatively movable members to bias yieldably the relative motion of said members between fixed limits of movement. With such springs, a problem has often arisen when the spring must be removed for repair or replacement, in that even when the spring-pressed members engaged by the spring are spaced apart by their maximum distance, the spring is often still under a heavy compressive load, and must be compressed still further before it can be removed, to free its ends from said members, which are usually provided with either sockets or studs for engaging and centering the ends of the spring. The difficulty of compressing a heavy spring so disposed, independently of the members between which it is normally engaged, can often be extreme, and within our knowledge no effective, convenient tool for performing the task has ever been available, with the result that removal of such springs has often necessitated disassembly of the overall structure including the spring-pressed members, which can be an extremely difficult, tedious and time-consuming operation. For example, coil springs are described are often used in the front wheel suspension linkages of automotive vehicles, and are quite commonly subjected to at least several hundred pounds of pressure even when the vehicle is jacked up so that none of the vehicle weight is supported by the wheel, and removal of such springs has often required disassembly of the complete suspension linkages.

The principal object of the present invention is, accordingly, the provision of a tool capable of compressing a spring mounted as described, in order to free it from its end mountings, in a rapid, convenient and easy operation.

Another object is the provision of a spring compressing tool including a pair of pressure plates adapted to be inserted transversely between the convolutions of the spring at points spaced apart axially of the spring, and an elongated screw and nut combination adapted to be inserted axially in the spring to interconnect said pressure plates and to draw said plates toward each other to compress the spring.

Other objects are simplicity and economy of construction, efficiency and dependability of operation, and adaptability for use with springs incorporated in a wide variety of applications.

Figure 2:
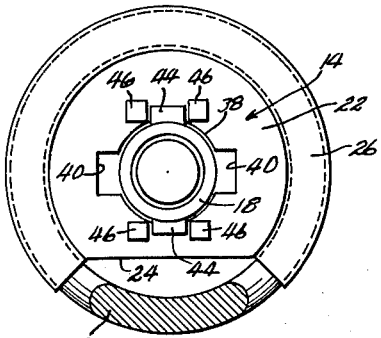
Figure 3:
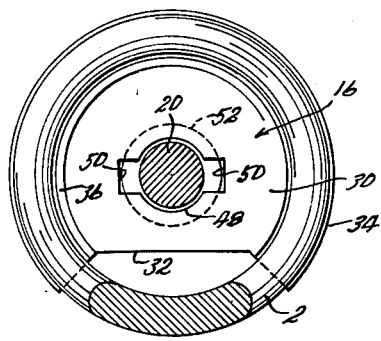
Figure 4:
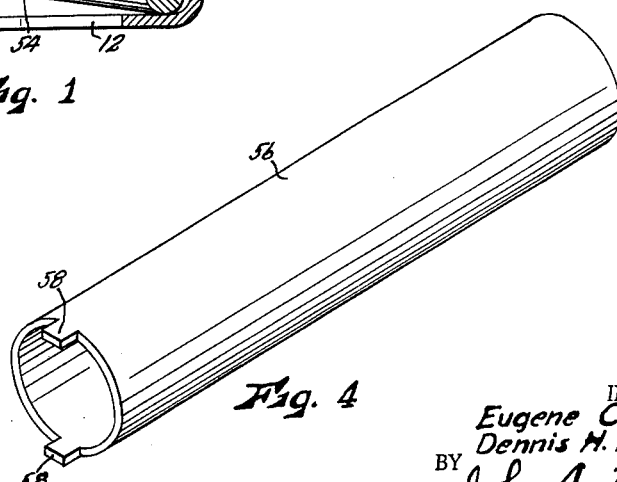

With these objects in view, as well as other objects which will appear in the course of the specification, reference will be had to the accompanying drawing, wherein:

FIG. 1 is a longitudinal sectional view of a helical compression spring mounted between end supports, with a compressing tool embodying the present invention applied operatively thereto, with parts left in elevation and parts broken away, FIG. 2 is a sectional view taken on line II—II of FIG. 1, FIG. 3 is a sectional view taken on line III—III of FIG. 1, and FIG. 4 is a perspective view of an auxiliary tool used in the application of the compressing tool.

Like reference numerals apply to similar parts throughout the several views, and the numeral 2 applies to a helical compression spring retained between an upper end support 4 and a lower end support 6. It will be understood that end supports 4 and 6 constitute elements of a larger assembly such as the wheel suspension linkage of an automobile, that said spring biases said end supports apart, and that said spring is under compression even when members 4 and 6 are separated to the maximum extent allowed by the assembly of which they are a part. The ends of the spring are engaged and centered on supports 4 and 6, for example as by a circular stud 8 affixed to support 4 and projecting axially into the spring, or as by engagement in a circular socket 10 shown formed in support 6. With either type of end mounting, it will be apparent that the spring must be compressed and shortened to free it from said end mountings, before said spring can be removed for repair or replacement. Either one of the end supports, lower end support 6 as shown, has an orifice 12 formed therethrough providing axial access to the interior of the spring. This access is essential to the present invention, as will appear. Such an aperture is already present in the lower end spring supports of most automotive wheel suspensions, to provide for the passage of shock absorbers normally extending through the springs. However, such an aperture could readily be formed in one of the end supports of a spring in nearly any usage.

The compressing tool forming the subject matter of the present invention consists generally of two pressure plates 14 and 16, an elongated tubular nut 18, and a screw 20. Pressure plate 14 consists of a circular disc 22 with a chordal segment thereof of about 90 degrees angular extent cut away to provide a straight edge 24, said disc being of somewhat smaller diameter than the internal diameter of spring 2, a helical peripheral flange 26 affixed to the edge of said disc, the ends of said flange being aligned with the straight edge 24 of the disc, and the external diameter of said flange corresponding generally to the external diameter of the spring, and a lip 28 depending from the inner edge of said flange, said lip being of equal angular extent to the flange, and corresponding generally in external diameter to the internal diameter of the spring, whereby to maintain the pressure plate coaxially centered with respect to the spring. The slope of helical flange 26 corresponds generally to the slope of the wire of which the spring is formed. The disc, flange and lip are preferably integral, and may be formed by forging, casting or the like. As thus far described, pressure plate 16 is identical to plate 14, having a disc 30 with a straight edge 32, a flange 34, and a lip 36. The two plates are adapted, however, to be inverted with respect to each other in spring 2, so that the lips 28 and 36 are disposed at the confronting faces thereof.

Disc 22 of pressure plate 14 has a circular hole 38 formed centrally therethrough, said hole having notches 40 at diametrically opposite sides thereof. Nut 18 comprises a circular tube internally threaded at one end, as indicated at 42, and is provided adjacent its opposite end with a pair of diametrically opposite lugs 44 affixed to the external surface thereof. The lugged end of the nut is adapted to be inserted upwardly through hole 38, lugs 44 passing through notches 40, then turned 90 degrees about its axis and lowered to engage each of lugs 44 between a pair of upstanding ears 46 affixed to or integral with the upper surface of disc 22, whereby the nut is secured against rotation relative to the disc. Disc 30 of pressure plate 16 also has a circular hole 48 formed centrally therethrough with notches 50 at diametrically opposite sides thereof. Screw 20 may be inserted upwardly through hole 48, being freely slidable therein, and threadably engaged at its upper end in the threaded portion 42 of nut 18. Screw 20 is provided at its lower end with a circular collar 52 adapted to engage the lower surface of disc 30, and a hexagonal wrench lug 54 depending from said collar, both said collar and said wrench lug being coaxial with and integral with or rigidly affixed to said screw.

In use, pressure plate 14 is first inserted transversely into spring 2 between successive convolutions thereof, it being sufficiently thin to permit said insertion, especially if it is inserted with a rotary or screw-like motion. It of course could not be so inserted if flange 26 were of full 360 degree extent, and said flange is therefore shortened. It is necessary only that said flange be of greater than 180 degrees angular extent, in order that it can exert a balanced and centered compressing force on the spring. However, with the proportions shown, it has been found quite practical to insert the plate when flange 26 is of about 270 degrees angular extent, and it is so illustrated. If obstructions near the spring have necessitated insertion of the pressure plate at a point away from the position in the spring at which it is desired eventually to place it, said pressure plate may be advanced in either direction axially of the spring by a tool such as shown in FIG. 4, consisting of a tube 56 having at one end a pair of axially projecting lugs 58 at diametrically opposite sides thereof. Said tool is inserted through aperture 12 of lower spring support to engage lugs 58 in notches 40 of disc 22, and then turned to advance plate 14 along the spring in the manner of a screw. Such a tool might be especially useful where, for example, the upper end portion of the spring is enclosed in a very deep socket.

Nut 18 is then inserted into the spring and engaged with pressure plate 14 as previously described. Pressure plate 16 is then inserted transversely between the convolutions of the spring in the same manner as plate 14, being advanced along the spring if necessary by a tool similar to that shown in FIG. 4 and having lugs adapted to engage notches 50 of disc 30, and screw 20 is inserted through hole 48 of plate 16 and threaded into nut 18. A deep socket wrench, not shown, may then be engaged on wrench lug 54 of the screw and turned to advance the screw into the nut, whereby pressure plates 14 and 16 are drawn closer together and the portion of the spring between said pressure plates is compressed, until the total length of the spring has been reduced sufficiently to free its ends from their mountings, such as stud 8 and socket 10, and the spring can be removed in a direction transverse to its axis.

The helical slope of the pressure plate flanges is sufficiently slight that the pressure plates have no tendency to rotate in the spring. In order to prevent the spring and tool from rotating as a unit as the screw is turned, it may be necessary to keep some end pressure on the spring continuously as the spring is shortened, so that the end supports will apply enough friction to prevent rotation of the spring. This may be done by moving lower end support 6 gradually upwardly as the spring is shortened. If upper support 4 represents the frame of an automobile, and lower support 6 represents a portion of the wheel suspension linkage affixed to a wheel axle, continuous end pressure may be maintained on the spring as it is shortened by jacking up the wheel gradually to cause support 6 to follow the spring. This may not be necessary where, as in some instances, one or both of the end supports of the spring are specially formed with stops preventing rotation of the spring.

In addition to the advantages of speed, simplicity, economy, and convenience of our device, as previously set forth, it will be seen that another advantage of our structure is that nut 18 and screw 20 constitute a rigid core in the spring at all times. This prevents any possibility that the compressed portion of the spring between the pressure plates might buckle laterally and therefore escape the tool. With springs of the strength contemplated for compression by use of this tool, such buckling and escape could easily result in serious damage to nearby equipment and serious injury to workmen.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. A compression tool for a helical compression spring mounted between end supports at least one of which has an aperture therein providing axial access to the interior of said spring, said tool comprising:
    (a) a pair of pressure plates adapted to be inserted transversely into said spring between the convolutions thereof so as to be spaced apart longitudinally of said spring, each of said pressure plates including a disc of smaller diameter than the internal diameter of said spring, a flange affixed peripherally to said disc and having an outer diameter greater than the internal diameter of said spring, said flange being helically formed about the axis of said disc and being of less than 360 but more than 180 degrees in angular extent, and a lip extending around the entire angular extent of said flange and projecting toward the other of said pressure plates in a direction parallel to the disc axis, said lip having a diameter less than the internal diameter of said spring, and
    (b) an elongated nut and screw assembly adapted to be inserted axially into said spring through said aperture, the nut and screw of said assembly being detachably interconnected respectively with said two pressure plates and secured against axial movement relative thereto in a direction toward the other of said pressure plates, said nut and screw being one rotatable and one non-rotatable, but not necessarily respectively, about its axis with respect to the pressure plate to which it is interconnected.

2. A compression tool as recited in claim 1 wherein the disc of the pressure plate nearest said apertured support has a hole formed therethrough through which said screw extends for rotation about its axis, and wherein said nut is detachably but non-rotatably secured in the disc of the other of said pressure plates, said screw being provided with a wrench lug at the end thereof adjacent said apertured support, said wrench lug being accessible through the aperture of said support.

3. A compression tool as recited in claim 1 wherein said nut comprises a cylindrical body having a pair of lugs affixed externally to opposite sides thereof, and wherein the disc of the pressure plate to which said nut is to be interconnected has a hole formed centrally therein for receiving said nut body slidably and rotatably therethrough in a direction away from the other of said pressure plates, said hole having notches at opposite sides thereof for passing said lugs, said disc having two pairs of upstanding ears on the side thereof distal from the other of said pressure plates, each of said pairs of ears being adapted to receive one of said lugs therebetween when said lugs are turned out of angular registry with said notches, whereby said nut body is secured against rotation relative to said disc.

References Cited by the Examiner

UNITED STATES PATENTS

| | | | |
|---|---|---|---|
| 1,389,657 | 9/1921 | Harsley et al. | 254—10.5 X |
| 2,652,625 | 11/1953 | Perkins | 29—283 |
| 3,051,443 | 8/1962 | Castoe | 254—10.5 |
| 3,067,500 | 12/1962 | Bliss | 29—227 |

WILLIAM FELDMAN, *Primary Examiner.*

J. C. PETERS, *Assistant Examiner.*